US012367855B2

(12) United States Patent
Lupini et al.

(10) Patent No.: US 12,367,855 B2
(45) Date of Patent: Jul. 22, 2025

(54) STRINGED MUSICAL INSTRUMENT AND ACOUSTIC EFFECT DEVICE

(71) Applicant: Yamaha Corporation, Hamamatsu (JP)

(72) Inventors: Peter Lupini, Victoria (CA); Glen Rutledge, Victoria (CA); Norm Campbell, Victoria (CA); Dan Godlovitch, Victoria (CA); Satsuki Kawahashi, Hamamatsu (JP); Motoi Nishio, Hamamatsu (JP); Hidenari Kim, Hamamatsu (JP); Shingo Ekuni, Hamamatsu (JP); Kenta Hori, Hamamatsu (JP); Kenji Iwamoto, Iwata (JP); Hidehisa Yasuno, Hamamatsu (JP); Max Lettau, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 642 days.

(21) Appl. No.: 17/701,094

(22) Filed: Mar. 22, 2022

(65) Prior Publication Data

US 2022/0310052 A1 Sep. 29, 2022

(30) Foreign Application Priority Data

Mar. 24, 2021 (JP) ................................ 2021-049408
Feb. 18, 2022 (JP) ................................ 2022-024166

(51) Int. Cl.
*G10H 3/18* (2006.01)
*G10D 1/08* (2006.01)
*G10H 1/18* (2006.01)

(52) U.S. Cl.
CPC ............... *G10H 3/18* (2013.01); *G10D 1/085* (2013.01); *G10H 1/18* (2013.01)

(58) Field of Classification Search
CPC ............. G10H 3/18; G10H 1/18; G10D 1/085
(Continued)

(56) References Cited

U.S. PATENT DOCUMENTS 4,028,977 A * 6/1977 Ryeczek .................. G10H 3/00 984/355
4,817,484 A * 4/1989 Iba ......................... G10H 3/188 84/DIG. 12
(Continued)

FOREIGN PATENT DOCUMENTS

CN 102693717 A * 9/2012 ............. G10H 3/185
CN 110767205 A 2/2020
(Continued)

OTHER PUBLICATIONS

Extended European Search Report issued in European Application No. 22162935.5 dated Jul. 19, 2022 (eight (8) pages).
(Continued)

*Primary Examiner* — Christina M Schreiber
(74) *Attorney, Agent, or Firm* — Crowell & Moring LLP

(57) ABSTRACT

A stringed musical instrument includes: a musical instrument body configured such that a string is attached thereto; a pickup configured to: i) detect vibration of the string and ii) output a string vibration signal according to the vibration; a detection sensor that is: i) attached to the musical instrument body and ii) configured to output a detection signal according to a force applied to the musical instrument body; and a controller that is attached to the musical instrument body, and is configured to output, based on the detection signal, a control signal configured to control an operation of an effector configured to impart an effect to the string vibration signal.

8 Claims, 5 Drawing Sheets

(58) Field of Classification Search
USPC .......................................................... 84/726
See application file for complete search history.

(56) References Cited

U.S. PATENT DOCUMENTS

| | | | | |
|---|---|---|---|---|
| 5,731,535 | A * | 3/1998 | Hudak | G10H 3/18 84/741 |
| 6,281,830 | B1 * | 8/2001 | Flety | G10H 1/0066 341/155 |
| 8,093,482 | B1 * | 1/2012 | Kramer | G10H 1/0551 84/645 |
| 8,633,370 | B1 * | 1/2014 | Raley | G10H 1/0083 84/723 |
| 9,000,287 | B1 * | 4/2015 | Andersen | G10H 3/186 84/622 |
| 9,601,100 | B1 * | 3/2017 | Dixon | G10H 3/182 |
| 9,653,055 | B1 * | 5/2017 | Savage | G10H 1/32 |
| 10,115,379 | B1 * | 10/2018 | Juszkiewicz | G10H 1/46 |
| 11,217,215 | B2 * | 1/2022 | Coyle | G10D 1/08 |
| 2003/0019349 | A1 * | 1/2003 | Green | G10H 1/32 84/731 |
| 2005/0109197 | A1 * | 5/2005 | Garrett | G10H 3/182 84/726 |
| 2005/0126375 | A1 * | 6/2005 | Hosler | G10H 3/146 84/726 |
| 2014/0150630 | A1 * | 6/2014 | Juszkiewicz | G10H 1/44 84/626 |
| 2015/0371623 | A1 * | 12/2015 | Gillette | G10H 3/181 84/726 |
| 2017/0154612 | A1 * | 6/2017 | Tsfasman | G10G 7/00 |
| 2017/0229105 | A1 * | 8/2017 | Sullivan | G10H 3/181 |
| 2018/0330703 | A1 | 11/2018 | Ekuni et al. | |
| 2022/0310052 | A1 * | 9/2022 | Lupini | G10H 1/0551 |
| 2024/0203380 | A1 * | 6/2024 | Shibata | G10D 1/085 |

FOREIGN PATENT DOCUMENTS

| | | | | |
|---|---|---|---|---|
| EP | 3982356 | A1 * | 4/2022 | G10D 1/085 |
| JP | 2000-148148 | A | 5/2000 | |
| JP | 2006047946 | A * | 2/2006 | G10H 1/32 |
| JP | 2014-206663 | A | 10/2014 | |
| WO | WO-2018201100 | A1 * | 11/2018 | G10H 1/0008 |
| WO | WO-2020244664 | A1 * | 12/2020 | G10D 1/085 |

OTHER PUBLICATIONS

English translation of Chinese-language Office Action issued in Chinese Application No. 202210249640.0 dated Feb. 25, 2025 (12 pages).

* cited by examiner

STRINGED MUSICAL INSTRUMENT AND ACOUSTIC EFFECT DEVICE

CROSS-REFERENCE TO RELATED APPLICATIONS

Priority is claimed to Japanese Patent Application No. 2021-049408, filed Mar. 24, 2021, the contents of which are incorporated herein by reference. Moreover, priority is claimed to Japanese Patent Application No. 2022-024166, filed Feb. 18, 2022, the contents of which are incorporated herein by reference.

BACKGROUND

The present disclosure relates to a stringed musical instrument and an acoustic effect device.

PCT International Publication No. WO 2018/20100 (hereinafter referred to as Patent Document 1) discloses a configuration in which various operating elements for controlling the operation of an effect imparting unit (effector), which imparts a musical or acoustic effect to a string vibration signal occurring according to vibration of a string, is provided on a side plate of an acoustic guitar (stringed musical instrument). The operating elements disclosed in Patent Document 1 are configured to be operated by being rotated with fingers.

However, in the configuration of Patent Document 1, the operating elements for controlling the effect imparting unit are provided on a side plate away from the strings. Therefore, in order for a player to control the effect imparting unit while playing the acoustic guitar (specifically, while plucking the strings with their fingers), the player needs to move their fingers away from the strings and to the side plate. That is to say, there is a problem that it is difficult for the player to control the operation of the effect imparting unit while playing the acoustic guitar.

SUMMARY

The present disclosure takes into consideration the above circumstances. An example object of the present disclosure is to provide a stringed musical instrument and an acoustic effect device capable of enabling a player to easily control an effect imparting unit even while playing the stringed musical instrument.

According to a first aspect of the present disclosure, a stringed musical instrument includes: a musical instrument body configured such that a string is attached thereto; a pickup configured to: i) detect vibration of the string and ii) output a string vibration signal according to the vibration; a detection sensor that is: i) attached to the musical instrument body and ii) configured to output a detection signal according to a force applied to the musical instrument body; and a controller that is attached to the musical instrument body, and is configured to output, based on the detection signal, a control signal configured to control an operation of an effector configured to impart an effect to the string vibration signal.

According to a second aspect of the present disclosure, an acoustic effect device used for a stringed musical instrument includes: a pickup configured to: i) detect vibration of a string of the stringed musical instrument and ii) output a string vibration signal according to the vibration; a detection sensor configured to be attached to the musical instrument body of the stringed musical instrument and output a detection signal according to a force applied to the musical instrument body; and a controller configured to output, based on the detection signal, a control signal configured to control an operation of an effector configured to impart an effect onto the string vibration signal.

According to a third aspect of the present disclosure, a stringed musical instrument includes: a musical instrument body configured such that a string is attached thereto; a pickup configured to: i) detect vibration of the string and ii) output a string vibration signal according to the vibration; a detection sensor configured to output a detection signal according to a player's operation performed with respect to a front plate or a back plate of a hollow part of the musical instrument body; and a controller that is attached to the musical instrument body, and is configured to output, based on the detection signal, a control signal configured to control an operation of an effect configured to impart an effect onto the string vibration signal.

DETAILED DESCRIPTION

Hereinafter, an embodiment of the present disclosure will be described, with reference to FIG. 1 to FIG. 4.

Figure 1:
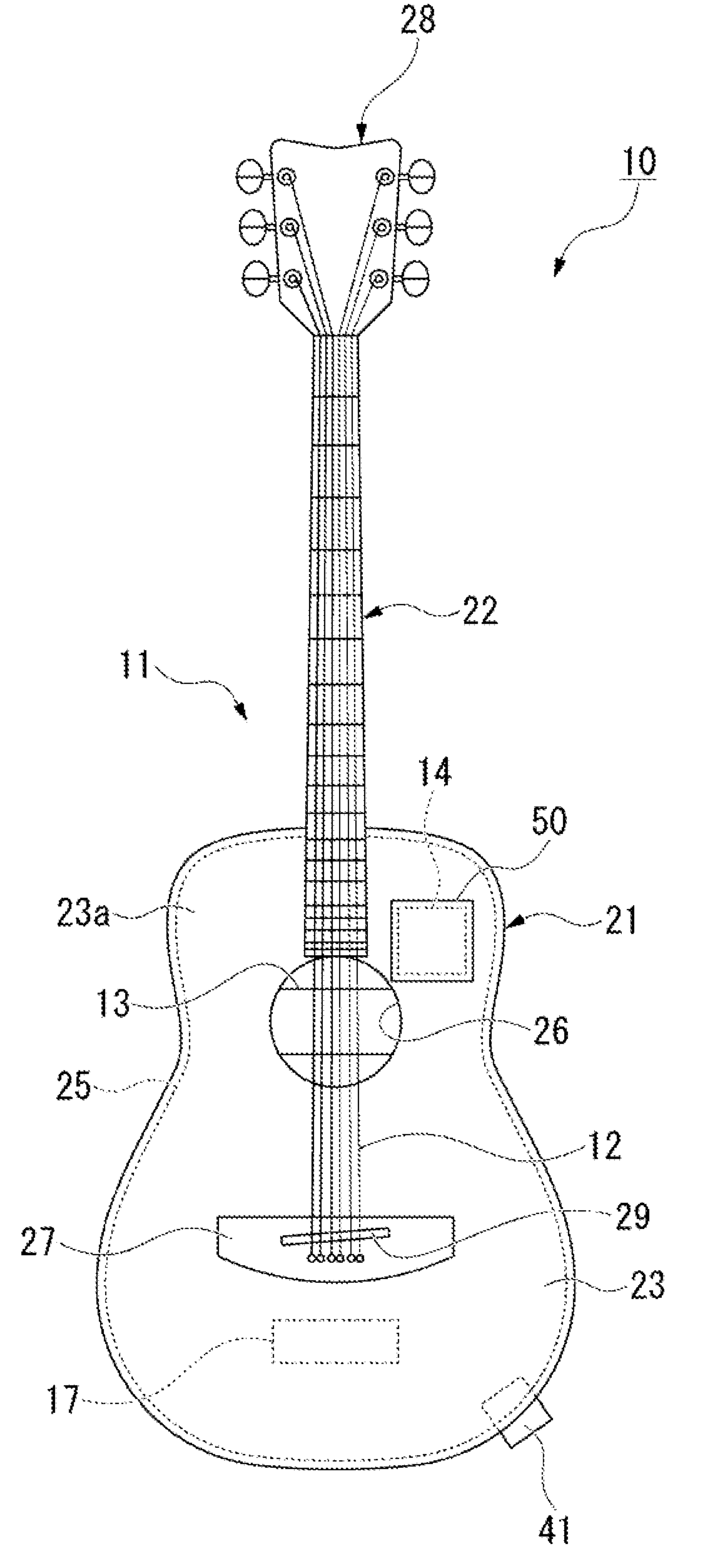
FIG. 1 is a front elevation view showing an inventive stringed musical instrument.
Figure 2:
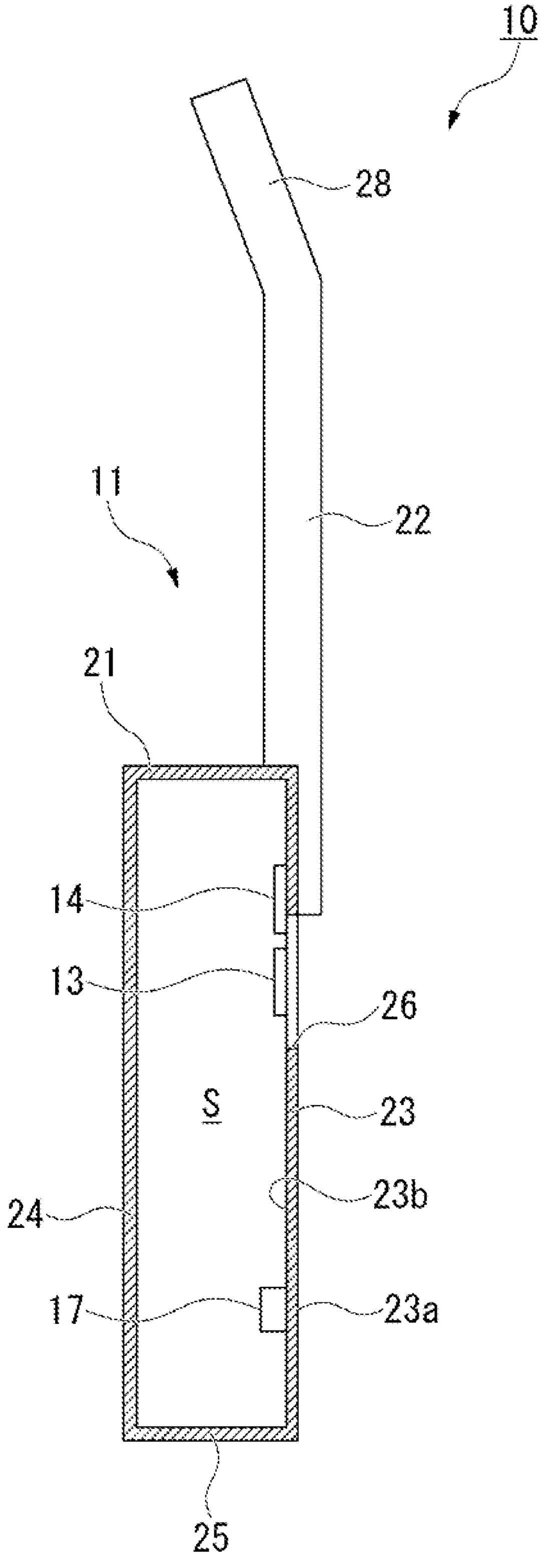
FIG. 2 is a cross-sectional view schematically showing the inventive stringed musical instrument.
Figure 3:
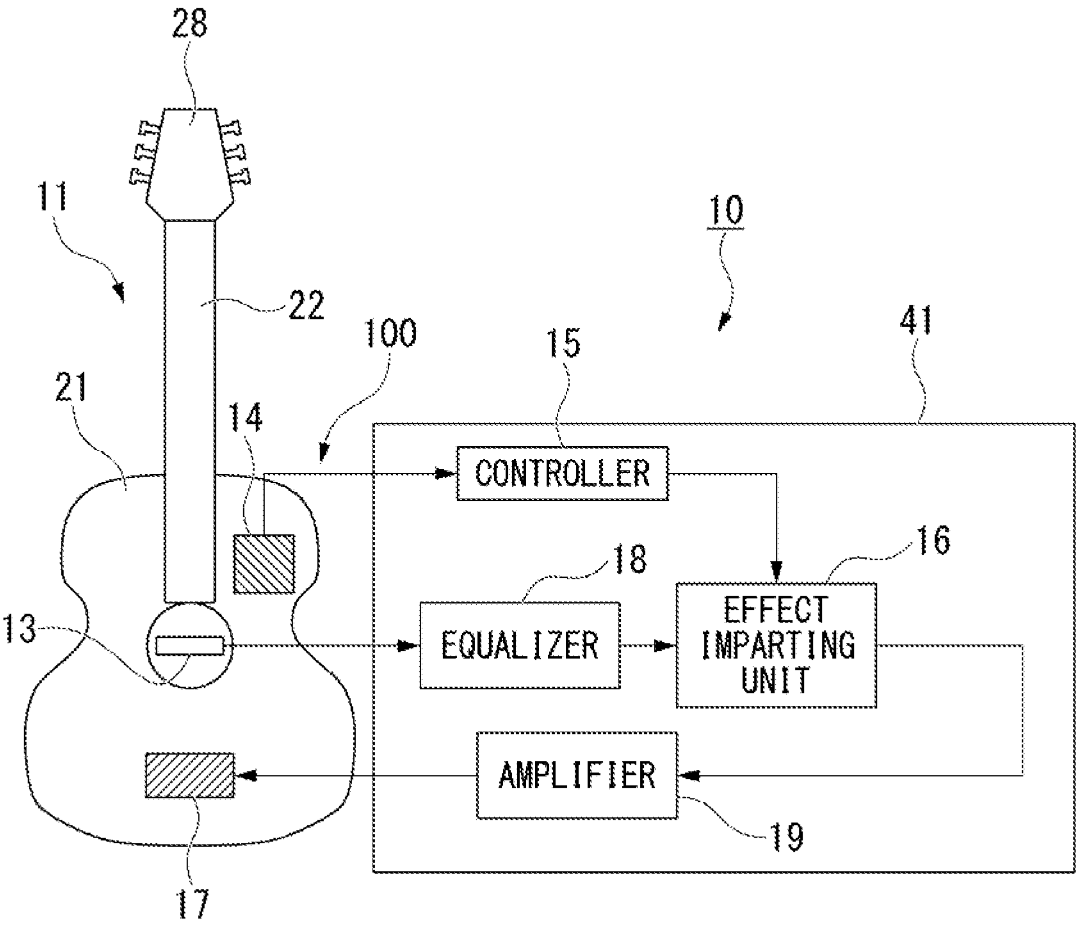
FIG. 3 is a block diagram showing the inventive stringed musical instrument.

As shown in FIG. 1 to FIG. 3, a stringed musical instrument 10 of the present embodiment is an acoustic guitar. The stringed musical instrument 10 includes a musical instrument body 11, strings 12, a pickup 13, a detection sensor 14, and a controller (control unit) 15. Also, the stringed musical instrument 10 of the present embodiment further includes an effect imparting unit 16 and a vibrator 17.

As shown in FIG. 1 and FIG. 2, the musical instrument body 11 includes a hollow part 21 and a neck 22.

The hollow part 21 is formed in a box shape having therein a cavity S. The hollow part 21 has a front plate 23, a back plate 24, and a side plate 25. The front plate 23 and the back plate 24 are each formed in a flat plate shape. The front plate 23 and the back plate 24 are arranged spaced apart from one another in the plate thickness direction thereof. The side plate 25 extends from the circumferential edge of the back plate 24 to the circumferential edge of the front plate 23. The front plate 23, the back plate 24, and the side plate 25 form the hollow part 21 having therein the cavity S.

In the front plate 23 of the hollow part 21 there is formed a sound hole 26 (sound chamber) penetrating therethrough in the plate thickness direction of the front plate 23. The sound hole 26 communicates the cavity S of the hollow part 21 with the space outside the hollow part 21. Moreover, on an outer surface 23*a* of the front plate 23 there is provided a tailpiece 27 for fastening a first end of each string 12 in the lengthwise direction.

The neck 22 extends in a direction away from the hollow part 21. At a distal end of the neck 22 there is provided a headstock (head, peghead) 28 for winding up a second end side of each string 12 in the lengthwise direction.

The strings 12 are strung over the hollow part 21 and the neck 22. Specifically, the first end of each string 12 is fastened to the tailpiece 27 on the hollow part 21, and the second end of each string 12 is wound at the headstock 28. As a result, the strings 12 are strung between the tailpiece 27 and the head 28.

Between the strings 12 strung above the outer surface 23*a* of the front plate 23 and the outer surface 23*a* of the front plate 23 there is provided a vibration transmitting unit 29 (bridge). As a result, in the stringed musical instrument 10, vibration of the string 12 is transmitted to the front plate 23 via the vibration transmitting unit 29, thereby vibrating the front plate 23. As a result, the air inside the hollow part 21 (cavity S) resonates, and a sound is radiated to the outside of the hollow part 21.

The pickup 13 detects vibration of the string 12 and outputs a string vibration signal according to the vibration of the string 12. In FIG. 1 and FIG. 2, the pickup 13 is arranged at the position on the front plate 23 where the sound hole 26 is formed, so as not to disturb the vibration of the front plate 23 associated with the vibration of the string 12. However, the embodiment of the disclosure is not limited to this example.

The effect imparting unit 16 (effector) shown in FIG. 3 and FIG. 4 generates a sound signal (so-called wet sound) in which a musical or acoustic effect is imparted to a string vibration signal output from the pickup 13 (or equalizer 18 described later), and outputs the sound signal.

The effect imparting unit 16 includes effect imparting elements 31 that each imparts a predetermined musical or acoustic effect, such as looper, distortion, wah-wah, reverb, or flanger. The effect imparting unit 16 may for example include only one effect imparting element 31. In the present embodiment, as shown in FIG. 4, the effect imparting unit 16 includes a plurality of effect imparting elements 31 (31*a* to 31*e*) that each impart a different effect.

The effect of the looper (effect imparting element 31*a*), which is one of the effect imparting elements 31, switches between start and stop of sound recording to thereby record a sound signal on the basis of an input string vibration signal or repeatedly reproduce a recorded sound signal.

Also, the effect imparting unit 16 includes a mixing circuit 32. The mixing circuit 32 mixes or selects, at an arbitrary ratio, output signals output from the effect elements according to the input string vibration signal input to the effect imparting unit 16 (wet sound) and a string vibration signal not passing through the effect elements (dry sound), and outputs the mixed or selected signals as a sound signal to an external unit (vibrator 17 or amplifier 19 described later) of the effect imparting unit 16.

The effect imparting unit 16 is attached to the musical instrument body 11. The effect imparting unit 16 may be stored, for example, in a storage part 41 attached to the hollow part 21 as shown in FIG. 1.

As shown in FIG. 1 to FIG. 3, the vibrator 17 is attached to the hollow part 21 of the musical instrument body 11. The vibrator 17 vibrates the hollow part 21 on the basis of a sound signal output from the effect imparting unit 16 according to the string vibration signal. As the vibrator 17 vibrates the hollow part 21, the sound to which the effect is imparted by the effect imparting unit 16 is radiated to the outside of the hollow part 21. The vibrator 17 may be an electro-acoustic transducer of a commonly known voice coil type or of any other type.

The vibrator 17 may be attached, for example, to the back plate 24 or the side plate 25. In the present embodiment, the vibrator 17 is attached to the front plate 23. Specifically, the vibrator 17 is attached to an inner surface 23*b* of the front plate 23. Also, the vibrator 17 is located in a region on the front plate 23 away from the peripheral region of the sound hole 26 (that is, away from the region where the detection sensor 14 is arranged). In FIG. 1, when the stringed musical instrument 10 is viewed from the front, the vibrator 17 is located in a region of the hollow part 21 such that the sound hole 26 and the tailpiece 27 are sandwiched between the vibrator 17 and the neck 22.

Figure 4:
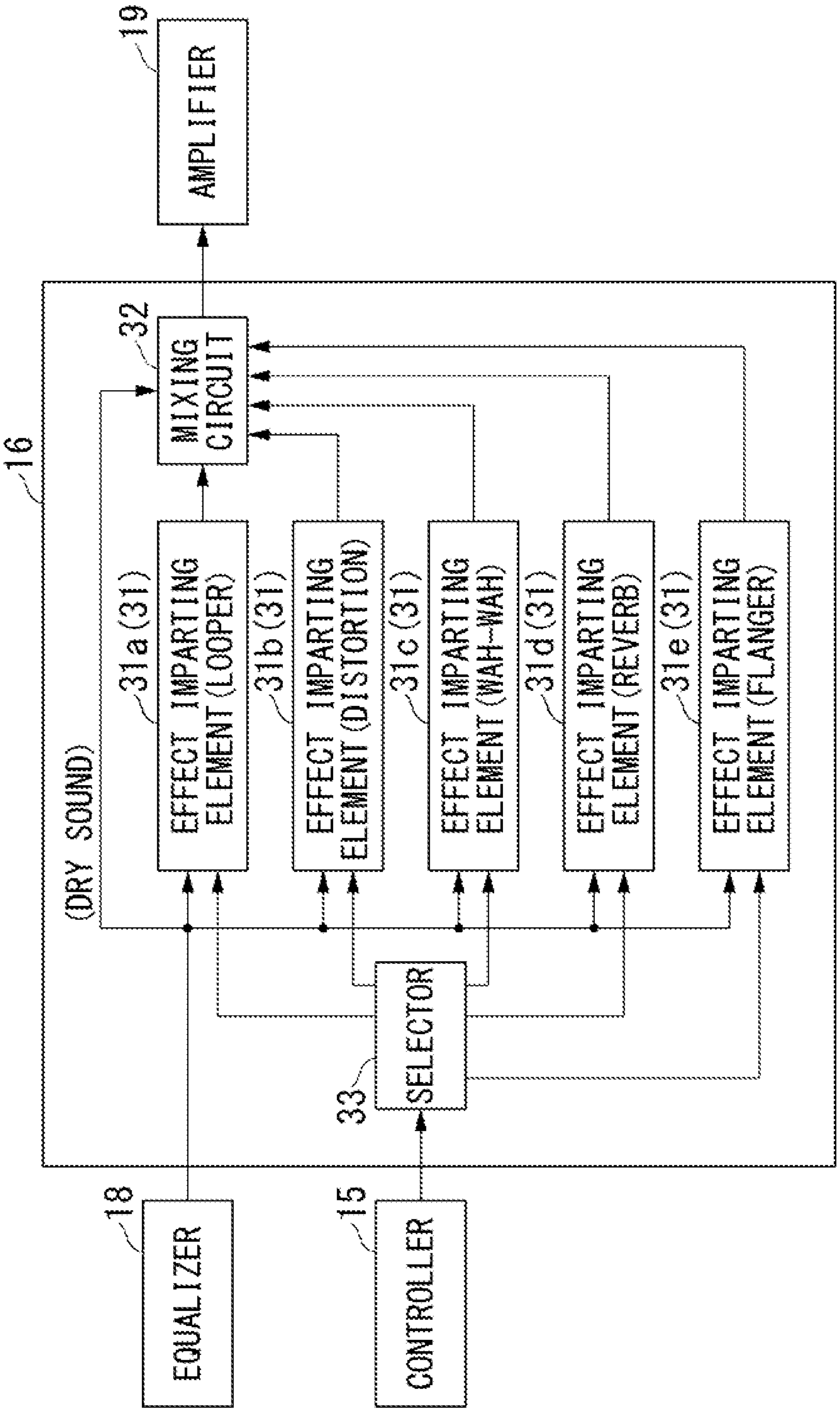
FIG. 4 is a block diagram showing an internal configuration of an effect imparting unit shown in FIG. 3.

As shown in FIG. 3 and FIG. 4, the stringed musical instrument 10 of the present embodiment further includes an equalizer 18 and an amplifier 19. The equalizer 18 adjusts the frequency characteristics of a string vibration signal output from the pickup 13. The equalizer 18 adjusts the frequency characteristics of the string vibration signal so as to emphasize, for example, a frequency region (for example, a harmonic component) higher than the fundamental tone frequency region of the string 12. The equalizer 18 outputs to the effect imparting unit 16 the string vibration signal the frequency characteristics of which have been adjusted. The amplifier 19 amplifies a sound signal output from the effect imparting unit 16 and outputs it to the vibrator 17.

In the present embodiment, the equalizer 18 and the amplifier 19 are attached to the musical instrument body 11. As with the effect imparting unit 16, the equalizer 18 and the amplifier 19 may be stored, for example, in the storage part 41 shown in FIG. 1.

As shown in FIG. 1 to FIG. 3, the detection sensor 14 is attached to the musical instrument body 11. The detection sensor 14 outputs a detection signal according to a force applied to the musical instrument body 11. The detection sensor 14 may be, for example, a deflection detection sensor 14 (for example, a strain gauge) that detects a deflection in the musical instrument body 11 when a force is applied to the musical instrument body 11. Moreover, the detection sensor 14 may be, for example, a pressure sensor that detects a pressure applied to the musical instrument body 11. Also, the detection sensor 14 may be, for example, an electrostatic sensor (capacitive touch sensor) that detects a touch applied by the player applied to the musical instrument body 11.

In the present embodiment, the detection sensor 14 is attached to a part of the hollow part 21. The detection sensor 14 may be attached, for example, to the back plate 24 or the side plate 25. In the present embodiment, the detection sensor 14 is attached to the front plate 23 as shown in FIG. 1 and FIG. 2. Specifically, the detection sensor 14 is attached to the inner surface 23*b* of the front plate 23. Also, the detection sensor 14 is located in the peripheral region of the sound hole 26 on the front plate 23. In FIG. 1, the detection sensor 14 is located on the right side of the strings 12 and the sound hole 26 when the stringed musical instrument 10 is viewed from the front (that is, when the stringed musical instrument 10 is viewed from the direction perpendicular to the front plate 23). However, the detection sensor 14 may be located on the left side, for example.

Of the front plate 23, the peripheral region of the sound hole 26 (in particular the region on the right side and left side of the strings 12 and the sound hole 26 in FIG. 1) is a region where the player's fingers (player's hand and fingers) are primarily positioned when the player plays the stringed musical instrument 10 by plucking the strings 12 on the stringed musical instrument 10, which is a guitar.

The detection sensor 14 is not limited to being attached to the inner surface 23*b* of the front plate 23. For example, the detection sensor 14 may be attached to the inner surface of the back plate 24 or the side plate 25. Moreover, the detection sensor 14 may be attached to the outer surface (surface) of the front plate 23, the back plate 24 or the side plate 25 of the hollow part 21. Furthermore, the detection sensor 14 may be embedded inside the front plate 23, the back plate 24 or the side plate 25. That is, it is sufficient that the detection sensor 14 is configured as a sensor that can detect a deflection in the musical instrument body 11 and is attached to the hollow part 21.

As shown in FIG. 1, the stringed musical instrument 10 of the present embodiment further includes a recognized part 50. The recognized part 50 is provided on the outer surface of the hollow part 21. In the present embodiment, the recognized part 50 is provided on the outer surface 23*a* of the front plate 23 of the hollow part 21. The recognized part 50 indicates the position of the detection sensor 15 that is provided on the inner surface of the hollow part 21. The recognized part 50 has a role of making the player visually or tactually recognize the position of the detection sensor 14.

It is sufficient that the recognized part 50 is provided, among the outer surface of the hollow part 21, at least an area to which a detection signal according to the force applied to the hollow part 21 is output. Therefore, for example, the recognized part 50 may be provided near the detection sensor 14 to the extent that they are not overlapped with each other when seen from the outside of the hollow part 21. Moreover, for example, the recognized part 50 may be provided at a position such that it is partially overlapped with (partially covers) the detection sensor 14 when seen from the outside of the hollow part 21. In the example shown in FIG. 1, the recognized part 50 is provided at a position such that it overlaps with (covers) all of the detection sensor 14 when seen from the outside of the hollow part 21.

In FIG. 1, the size of the recognized part 50 is larger than the size of the detection sensor 14 when seen from the outside of the hollow part 21; however, the disclosure is not limited to this example. The size of the recognized part 50 may be smaller than the size of the detection sensor 14 when seen from the outside of the hollow part 21. Moreover, in FIG. 1, the shape of the recognized part 50 in planar view is a rectangular shape that is similar to that of the detection sensor 14 when seen from the outside of the hollow part 21; however, the disclosure is not limited to this example. The recognized part 50 may be formed in an arbitrary shape.

The recognized part 50 may be a sticker attached to the outer surface of the hollow part 21, for example. In the case where the recognized part 50 is a sticker, there is formed a step between the outer surface of the hollow part 21 and the recognized part 50. Therefore, a player of the stringed musical instrument 10 can tactually recognize the position of the detection sensor 14 by the step.

A stacker which serves as the recognized part 50 may be opaque, translucent or transparent. For example, characters, symbols, patterns, pictures, or the like may be formed on the sticker by printing or the like. Further, surface treatment may be applied to the sticker so that its surface roughness is different from that of the outer surface of the hollow part 21, for example. Further, the sticker may be a texture sticker which is formed by digging characters, symbols, patterns, pictures, or the like, for example. By forming the sticker in this manner, a player of the stringed musical instrument 10 can also visually or tactually recognize the position of the detection sensor 14 by the step.

When the recognized part 50 is a sticker, the recognized part 50 can be provided on the outer surface of the hollow part 21 easily at low cost as compared with the case where the recognized part 50 is a decal, an inlay, or a branding iron described later. Moreover, in this case, the recognized part 50 can be easily removed (peeled) from the hollow part 21.

Moreover, the recognized part 50 may be a decal or an inlay that is provided on the outer surface of the hollow part 21, for example. Moreover, the recognized part 50 may be a branding iron formed on the outer surface of the hollow part 21, for example. When the recognized part is a decal, it is necessary to protect the decal with a transparent coating film (coating layer). An inlay has a structure in which a digging is formed in the outer surface of the hollow part 21 and another material (for example, wood or shell) is fitted into the digging. When the recognized part 50 is a decal, an inlay, or a branding iron, a performer of the stringed musical instrument 10 can mainly visually recognize the position of the detection sensor 14. When the recognized part 50 is a decal, an inlay, or a branding iron, the appearance design of the stringed musical instrument 10 can be improved as compared with the sticker.

Moreover, the recognized part 50 may be formed by various printing methods such as stamp printing or sticker printing that is directly applied to the outer surface of the hollow part 21. When the recognized part 50 is formed by printing, a player of the stringed musical instrument 10 can recognize the position of the detection sensor 14 mainly visually. When the recognized part 50 is formed by printing, it is possible to improve the degree of freedom in design of characters, symbols, patterns, pictures, or the like. The controller 15 shown in FIG. 3 and FIG. 4 is attached to the musical instrument body 11. As with the effect imparting unit 16, the controller 15 may be stored, for example, in the storage part 41 shown in FIG. 1. As shown in FIG. 3 and FIG. 4, on the basis of a detection signal output from the detection sensor 14, the controller 15 outputs a control signal for controlling the operation of the effect imparting unit 16, to the effect imparting unit 16. The controller 15 may output different types of control signals from the controller 15, depending, for example, on the number of times a force is applied to the musical instrument body 11 or the length of time a force is applied to the musical instrument body 11.

The controller 15 outputs a control signal according to the magnitude of the amplitude (intensity) of a detection signal output from the detection sensor 14 or the height of the frequency of the detection signal. Specifically, the controller 15 outputs a control signal if the amplitude of a detection signal is greater than the maximum amplitude of the front plate 23 (musical instrument body 11) when a sound is radiated from the stringed musical instrument 10. Also, the controller 15 outputs a control signal if the frequency of a detection signal is lower than the lowest frequency of the front plate 23 (musical instrument body 11) when a sound is radiated from the stringed musical instrument 10. As a result, it is possible to suppress or prevent a control signal from being output from the controller 15 as a result of simply radiating a sound from the stringed musical instrument 10.

The control signal output from the controller 15 may, for example, be a signal for switching ON/OFF of the effect imparting unit 16 (effect imparting element 31). In such a case, the control signal output from the controller 15 may, for example, be a signal for switching between start and stop of sound recording performed by the looper (effect imparting element 31*a*), which is one of the effect imparting elements 31.

Also, the control signal output from the controller 15 may be a signal that adjusts the strength or magnitude of an effect imparted to a string vibration signal according to the magnitude of the force applied to the front plate 23 (musical instrument body 11), for example. For example, the magnitude of a distortion effect, a wah-wah effect, a reverb effect, or a flanger effect, or the magnitude of an arming (tremolo arm) effect (arm down or arm up) may be adjusted according to the magnitude of the force applied to the front plate 23 (instrument body 11).

As described above, the effect imparting unit 16 of the present embodiment includes a plurality of effect imparting elements 31 shown in FIG. 4. For this reason, the effect imparting unit 16 further includes a selector 33 for selecting to which of the effect imparting elements 31 is to be input a control signal output from the controller 15. The selector 33 may be operated according to, for example, a control signal output from the controller 15, or may be operated by an operation input by means of an operating element (not shown in the drawings), which is provided separately.

In the present embodiment, the storage unit 41 shown in FIG. 1 may also store, in addition to the aforementioned controller 15, effect imparting unit 16, equalizer 18, and amplifier 19, a power supply for supplying electric power to these electrical components, and various operating elements such as an operating element for the selector 33 and a power supply switch.

As described above, in the stringed musical instrument 10 of the present embodiment, the detection sensor 14 attached to the musical instrument body 11 functions as an operating element for controlling the operation of the effect imparting unit 16. That is to say, the player of the stringed musical instrument 10 can control the operation of the effect imparting unit 16 by applying a force to the musical instrument body 11 (for example, bending the surface of the hollow part 21 or hitting or touching the surface of the hollow part 21). As a result, it is possible to control the operation of the effect imparting unit 16 without moving the positions of the player's fingers far from the strings 12. Therefore, the player can easily control the effect imparting unit 16 even while playing the stringed musical instrument 10.

Moreover, in the stringed musical instrument 10 of the present embodiment, the detection sensor 14 is attached to a part of the hollow part 21 of the musical instrument body 11. Accordingly, the player can easily control the operation of the effect imparting unit 16 by pressing a part of the hollow part 21 with their arm or fingers to apply a pressure to a part of the surface of the hollow part 21 or to bend a part of the surface of the hollow part 21, or alternatively by hitting or touching a part of the surface of the hollow part 21. Furthermore, when the player plays the stringed musical instrument 10 by plucking the strings 12, the player's arm and fingers generally overlap the hollow part 21. By applying a force to the front plate 23 of the hollow part 21 in this state using the player's arm and fingers, the player can easily control the operation of the effect imparting unit 16 with almost no need for moving the positions of the arm and fingers when playing the stringed musical instrument 10.

Moreover, in the stringed musical instrument 10 of the present embodiment, the detection sensor 14 is attached to the front plate 23 of the hollow part 21. Therefore, the player can bend the front plate 23 to control the operation of the effect imparting unit 16 by simply pressing the front plate 23 with their own fingers. Here, when the player plays the stringed musical instrument 10 by plucking the strings 12, the player's fingers are generally positioned above the front plate 23. Therefore, the player can easily control the operation of the effect imparting unit 16 with almost no need for moving the positions of the fingers when playing the stringed musical instrument 10.

Moreover, in the stringed musical instrument 10 of the present embodiment, the detection sensor 14 is attached to the inner surface of the hollow part 21. As a result, it is possible to prevent degradation in the appearance design of the stringed musical instrument 10 associated with the detection sensor 14 being attached to the hollow part 21.

In the stringed musical instrument 10 of the present embodiment, the vibrator 17 attached to the hollow part 21 vibrates the hollow part 21 on the basis of a sound signal output from the effect imparting unit 16 according to the string vibration signal from the pickup 13. As a result, a sound having a musical or acoustic effect imparted thereto can be produced in the stringed musical instrument 10 (hollow part 21).

Moreover, in the stringed musical instrument 10 of the present embodiment, the effect imparting unit 16 is attached to the musical instrument body 11. As a result, the stringed musical instrument 10 alone can produce a sound having an effect imparted thereto by the effect imparting unit 16. The effect of such a configuration is especially useful when the stringed musical instrument 10 has an acoustic guitar-like appearance. This point will be described below.

For example, in those cases where the effect imparting unit 16 is provided separately from an acoustic guitar, the controller 15 of the stringed musical instrument 10 and the effect imparting unit 16 need to be electrically connected by a connection cable or the like. However, a typical acoustic guitar has no connection cable connected thereto, and therefore, an appearance of the stringed musical instrument 10 having a connection cable connected thereto would differ from that of a typical acoustic guitar and be unnatural. In contrast, if the effect imparting unit 16 is attached to the musical instrument body 11, there is no need for connecting a connection cable to the stringed musical instrument 10, and as a result, the appearance of the stringed musical instrument 10 can be made similar to that of a typical acoustic guitar.

Moreover, in the stringed musical instrument 10 of the present embodiment, the effect imparting unit 16 includes a looper. Also, a control signal output from the controller 15 includes a signal for switching between start and stop of sound recording performed by the looper. Accordingly, the player can easily switch between start and stop of sound recording performed by the looper without moving the positions of fingers far from the strings 12 (that is, without disturbing the performance of the stringed musical instrument 10). That is to say, the player can easily take advantage of the function of the looper.

The stringed musical instrument 10 of the present embodiment includes the recognized part 50 that is provided on the outer surface of the hollow part 21 and that indicates the position of the detection sensor 50. Therefore, even if a player of the stringed musical instrument 10 cannot visually recognize the detection sensor 14 from the outside of the hollow part 21, the position of the detection sensor 50 can be grasped by the recognized part 50. Therefore, it is possible to suppress or prevent the player of the stringed musical instrument 10 from failing to operate the detection sensor 14. Failure to operate the detection sensor 14 by the player means that, for example, even if the player pushes the hollow part 21, the force is not transmitted to the detection sensor 14 and the detection signal is not output from the detection sensor 14.

The example embodiment of present disclosure has been described in detail above. However, the present disclosure is not limited to the above embodiment, and various modifications may be made without departing from the scope of the present disclosure.

Figure 5:
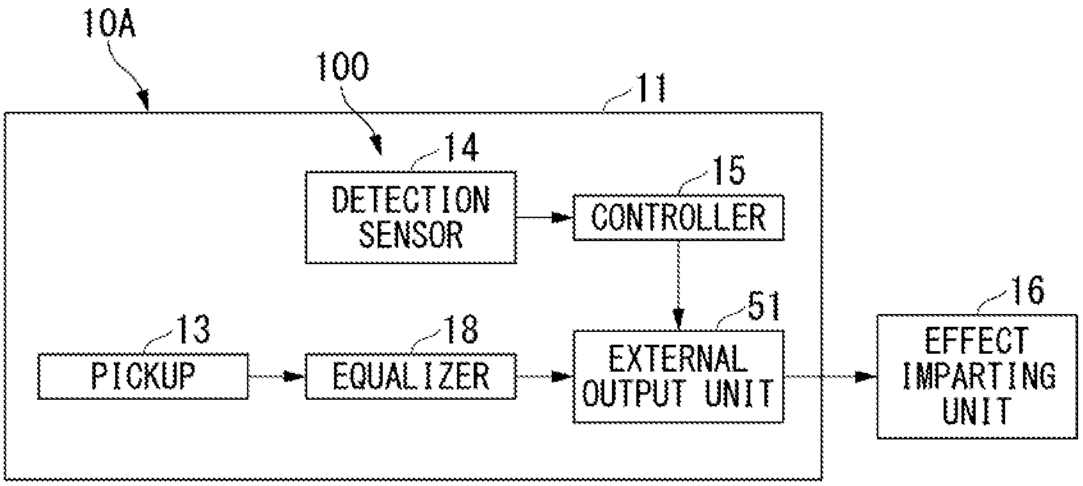
FIG. 5 is a block diagram of the inventive stringed musical instrument.

In one embodiment of the present disclosure, the effect imparting unit 16 need not be attached to the musical instrument body 11, that is to say, it need not be included in the stringed musical instrument. In such a case, for example, as shown in FIG. 5, a stringed musical instrument 10A may include an external output unit 51. The external output unit 51 outputs a control signal output from the controller 15 to the effect imparting unit 16 provided outside the musical instrument body 11. The external output unit 51 may be an external connection terminal for establishing a wired connection to the effect imparting unit 16, or may be a wireless communication unit for establishing a wireless connection to the effect imparting unit 16.

For the stringed musical instrument 10A that includes the external output unit 51, the effect imparting unit 16 can be provided separately from the stringed musical instrument 10A, and it is therefore possible to select any type of effect imparting unit 16 for use.

In one embodiment of the present disclosure, the detection sensor 14 may be attached, for example, to the neck 22. In such a case, it is possible, while playing the stringed musical instrument 10, for the player to cause the detection sensor 14 to output a detection signal by bending the neck 22 or pressing a portion of the neck 22 provided with the detection sensor 14, to apply a force to the neck 22. That is to say, even in a case where the detection sensor 14 is provided on the neck 22, the player can still easily control the effect imparting unit 16 while playing the stringed musical instrument 10.

One embodiment of the present disclosure may also be an acoustic effect device 100 (see FIG. 3 and FIG. 5) that includes at least the pickup 13, the detection sensor 14, and the controller 15, and is used for the stringed musical instrument 10. The acoustic effect device 100 may further include one or both of the vibrator 17 and the effect imparting unit 16. Also, the acoustic effect device 100 may include the equalizer 18 and the amplifier 19.

By attaching the acoustic effect device 100 to an existing stringed musical instrument, the existing stringed musical instrument can have functions similar to those of the stringed musical instruments 10, 10A of the embodiment described above. For example, by attaching the detection sensor 14 of the acoustic effect device 100 to the musical instrument body 11 of an existing stringed musical instrument, the detection sensor 14 functions as an operating element for controlling the operation of the effect imparting unit 16. As a result, the player of the stringed musical instrument 10 can control the operation of the effect imparting unit 16 by applying a force to the musical instrument body 11 (for example, by bending, hitting, or touching the hollow part 21 or the neck 22).

In one embodiment of the present disclosure, the part of the player that applies a force to a part of the stringed musical instrument in order to output a detection signal from the detection sensor 14 may be a part other than their hand (for example, arm, elbow, abdomen, waist, thigh, and so forth).

The embodiment described above assumes that the detection sensor 14 is operated by the player's hand, and the detection sensor 14 is attached to the front plate 23 of the hollow part 21 accordingly. However, assuming the player's elbow is to apply a force to a part of the stringed musical instrument, the detection sensor 14 may be provided in a portion of the stringed musical instrument with which the player's elbow is likely to come into contact (for example, a predetermined position on the front plate 23). Also, for example, in a case of attaching the detection sensor 14 to the back plate 24 or the side plate 25 of the hollow part 21, the player's abdomen, waist, or thigh may apply a force to the back plate 24 or the side plate 25, which is a part of the stringed musical instrument. Moreover, in the embodiment, the detection sensor 14 is provided inside (inner surface) of the hollow part 21; however the disclosure is not limited to this example. The detection sensor 14 may be provided on the front surface (outer surface) of the hollow part 21.

One embodiment of the present disclosure can also be perceived as a detection sensor outputting a detection signal according to the player's operation performed with respect to the front plate 23 or the back plate 24 of the hollow part 21 of the musical instrument body 11. The "player's operation performed with respect to the front plate 23 or the back plate 24" in one embodiment of the present disclosure refers to the operation described in the above embodiment, that is, the player bending the front plate 23 or the back plate 24 of the hollow part 21, hitting the front plate 23 or the back plate 24, touching the front plate 23 or the back plate 24 hollow part, or moving closer to or moving away from the front plate 23 or the back plate 24.

Also, in the stringed musical instrument of one embodiment of the present disclosure, as the detection sensor, instead of or in addition to the sensor mentioned above for detecting the player's operation, an electrostatic sensor may be used as a sensor for detecting the motion of a portion of the player such as their hand moving closer thereto or moving away therefrom. Moreover, an electrostatic sensor (capacitive touch sensor) or a membrane switch can also be used as a sensor for detecting the motion of contacting with a portion of the player, such as a hand. In a case of attaching an electrostatic sensor to the front plate 23 or the back plate 24 of the hollow part 21, the "player's operation performed with respect to the front plate 23 or the back plate 24" described above may also include the motion of the player moving a portion of their body, such as a hand, closer to or away from the front plate 23 or the back plate 24. When an electrostatic sensor (capacitive touch sensor) or a membrane switch is attached to the front plate 23 or the back plate 24 of the hollow part 21, the above-mentioned "player's operation performed with respect to the front plate 23 or the back plate 24" may include the motion of the player touching the front plate 23 or the back plate 24 with a portion of their body such as a hand. It should be noted that the electrostatic sensor may detect the motion of the player moving a portion of their body, such as a hand or an arm, closer to or away from the side plate 25 instead of the front plate 23 or the back plate 24, or in addition to the front plate 23 and the back plate 24. Moreover, an electrostatic sensor (capacitive touch sensor) or a membrane switch may detect the motion of the player touching the side plate 25 with a portion of their body, such as a hand or an arm, to instead of the front plate 23 or the back plate 24, or in addition to the front plate 23 and the back plate 24. Moreover, in these cases as well, the detection sensor 14 may be provided inside (inner surface) of the hollow part 21, provided on the front surface (outer surface) of the hollow part 21, or embedded inside the front plate 23, the back plate 24 or the side plate 25. That is, it is sufficient that the detection sensor 14 is attached to the hollow part 21 as a sensor that can detect the operation of the player. When the detection sensor 14 is provided on the front surface of the hollow part 21, the detection sensor 14 itself also serves as the recognized part 50.

One embodiment of the present disclosure may be applied not only to an acoustic guitar that includes a hollow part 21 having therein a cavity S, but also to a guitar in which the hollow part thereof does not produce resonant sound on the basis of the vibration of strings (such as an electric guitar or an electric bass, which does not have a cavity inside the hollow part thereof, or a silent guitar (registered trademark), which includes a hollow part composed of a frame). In such a case, for an electric guitar, the detection sensor may be provided, for example, in the vicinity of the pickup, and for a guitar that includes a hollow part composed of a frame, the detection sensor may be provided, for example, on the frame.

One embodiment of the present disclosure is applicable not only to a guitar having a hollow part and a neck, but also to a stringed musical instrument having at least a musical instrument body and a string attached to the musical instrument body, such as a violin, a viola, a cello, or a contrabass.

According to one embodiment of the present disclosure, a player can easily control an effect imparting unit even while playing a stringed musical instrument.

What is claimed is:

1. A stringed musical instrument comprising:
- a musical instrument body configured such that a string is attached thereto;
- a pickup configured to: i) detect vibration of the string and ii) output a string vibration signal according to the vibration;
- a detection sensor that is: i) attached to the musical instrument body and ii) configured to output a detection signal according to a force applied to the musical instrument body; and
- a controller that is attached to the musical instrument body, and is configured to output, based on the detection signal, a control signal configured to control an operation of an effector configured to impart an effect to the string vibration signal, wherein
  - the musical instrument body includes a hollow part that has a front plate, a back plate, and a side plate,
  - the detection sensor is attached to an inner surface of the front plate, inside the hollow part, and
  - the detection sensor is also configured to detect a deflection in the musical instrument body.

2. The stringed musical instrument according to claim 1, further comprising:
- a vibrator that is attached to the hollow part of the musical instrument body,
- wherein the vibrator is configured to vibrate the hollow part based on a sound signal output from the effector according to the string vibration signal.

3. The stringed musical instrument according to claim 1, wherein the effector is attached to the musical instrument body.

4. The stringed musical instrument according to claim 1, further comprising:
- an external output unit configured to output the control signal to the effector provided outside the musical instrument body.

5. The stringed musical instrument according to claim 1, wherein
- the effector includes a looper, and
- the control signal output from the controller includes a signal configured to switch between a start and a stop of sound recording performed by the looper.

6. The stringed musical instrument according to claim 1, wherein
- the stringed musical instrument further comprises a sticker that is provided on an outer surface of the hollow part and that indicates a position of the detection sensor.

7. An acoustic effect device used for a stringed musical instrument, comprising:
- a pickup configured to: i) detect vibration of a string of the stringed musical instrument and ii) output a string vibration signal according to the vibration;
- a detection sensor configured to be attached to a musical instrument body of the stringed musical instrument and output a detection signal according to a force applied to the musical instrument body; and
- a controller configured to output, based on the detection signal, a control signal configured to control an operation of an effector configured to impart an effect onto the string vibration signal, wherein
  - the musical instrument body includes a hollow part that has a front plate, a back plate, and a side plate,
  - the detection sensor is attached to an inner surface of the front plate, inside the hollow part, and
  - the detection sensor is also configured to detect a deflection in the musical instrument body.

8. A stringed musical instrument comprising:
- a musical instrument body configured such that a string is attached thereto;
- a pickup configured to: i) detect vibration of the string and ii) output a string vibration signal according to the vibration;
- a detection sensor configured to output a detection signal according to a player's operation performed with respect to a front plate or a back plate of a hollow part of the musical instrument body; and
- a controller that is attached to the musical instrument body, and is configured to output, based on the detection signal, a control signal configured to control an operation of an effector that is configured to impart an effect onto the string vibration signal, wherein
  - the detection sensor is attached to an inner surface of the front plate, inside the hollow part, and
  - the detection sensor is also configured to detect a deflection in the musical instrument body.

* * * * *